US012643169B2

(12) United States Patent
Hofmanninger et al.

(10) Patent No.: US 12,643,169 B2
(45) Date of Patent: Jun. 2, 2026

(54) WELDING ASSEMBLY COMPRISING A WELDING DEVICE AND A WELDING COMPONENT CONNECTED TO THE WELDING DEVICE

(71) Applicant: Fronius International GmbH, Pettenbach (AT)

(72) Inventors: Franz Hofmanninger, Wels-Thalheim (AT); Christoph Ramsauer, Wels-Thalheim (AT)

(73) Assignee: Fronius International GmbH, Pettenbach (AT)

( * ) Notice: Subject to any disclaimer, the term of this patent is extended or adjusted under 35 U.S.C. 154(b) by 549 days.

(21) Appl. No.: 18/274,831

(22) PCT Filed: Feb. 28, 2022

(86) PCT No.: PCT/EP2022/054928
§ 371 (c)(1),
(2) Date: Jul. 28, 2023

(87) PCT Pub. No.: WO2022/184613
PCT Pub. Date: Sep. 9, 2022

(65) Prior Publication Data
US 2024/0139849 A1      May 2, 2024

(30) Foreign Application Priority Data
Mar. 1, 2021    (EP) .................................... 21159979

(51) Int. Cl.
*B23K 9/067*        (2006.01)
*B23K 9/32*         (2006.01)
(52) U.S. Cl.
CPC ................ *B23K 9/067* (2013.01); *B23K 9/32* (2013.01)

(58) Field of Classification Search
CPC .................................. B23K 9/32; B23K 9/067
(Continued)

(56) References Cited

U.S. PATENT DOCUMENTS 6,315,186 B1 * 11/2001 Friedl .................. B23K 9/1062
228/102

FOREIGN PATENT DOCUMENTS

DE      20 2016 105 936        3/2018
EP         1 021 269        4/2003
(Continued)

OTHER PUBLICATIONS

Avago Technologies, "Optocouplers—Designer's Guide", Avago Technologies, XP055839133, Retrieved from the Internet: https://docs.broadcom.com/doc/AV02-4387EN, [retrieved on Sep. 8, 2021], Jan. 3, 2014.
(Continued)

*Primary Examiner* — Elizabeth M Kerr
*Assistant Examiner* — Simpson A Chen
(74) *Attorney, Agent, or Firm* — GREENBLUM & BERNSTEIN, P.L.C.

(57)                    ABSTRACT

Embodiments reduce the draining of HF ignition energy via a data line for data transmission between a welding device and another part of a welding assembly. A decoupling apparatus is provided, in which a first data line portion of the data line is connected to a first coupling element and a second data line portion of the data line is connected to a second coupling element. The first coupling element and the second coupling element are interconnected via a wireless coupling path for galvanic separation of the data line, and a separate power supply is provided for each of the first coupling element and the second coupling element. The power supplies of the first coupling element and the second
(Continued)

Figure 1:
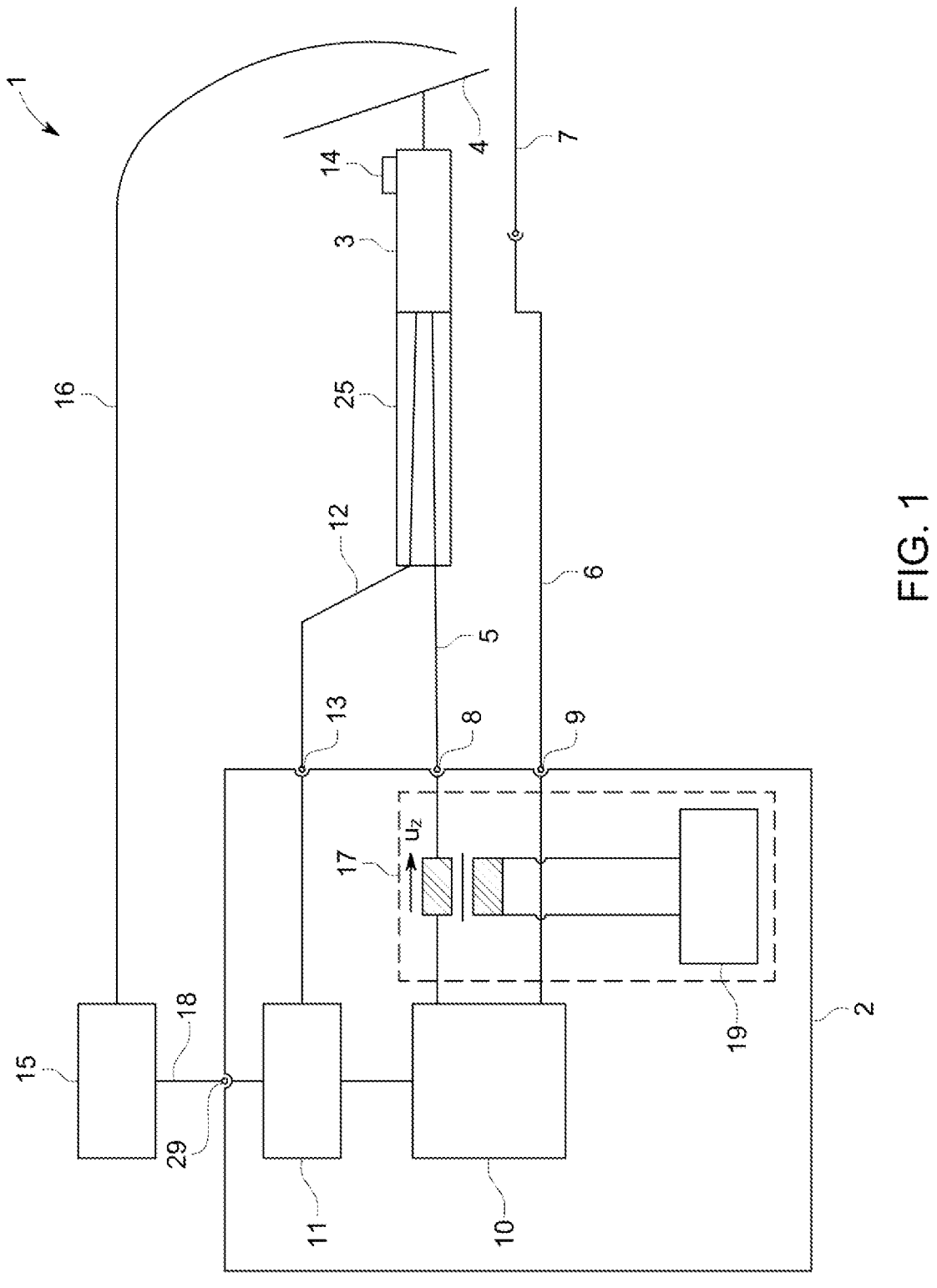

coupling element are decoupled from one another for a HF voltage on the data line as a result of the HF ignition voltage.

10 Claims, 5 Drawing Sheets

(58) Field of Classification Search
USPC ..................................................... 219/121.11
See application file for complete search history.

(56)                    References Cited

FOREIGN PATENT DOCUMENTS

| | | | |
|---|---|---|---|
| EP | 1 704 012 | | 4/2009 |
| JP | 2003-340573 | | 12/2003 |
| JP | 2003340573 | A * | 12/2003 |
| JP | 2014-188531 | | 10/2014 |
| JP | 2017-532943 | | 11/2017 |
| WO | 99/36219 | | 7/1999 |

OTHER PUBLICATIONS

Int'l Search Report (Form PCT/ISA/210) conducted in Int'l Appln. No. PCT/EP2022/054928 (May 19, 2022).
Int'l Written Opinion (Form PCT/ISA/237) conducted in Int'l Appln. No. PCT/EP2022/054928 (May 19, 2022).
Japan Office Action conducted in counterpart Japan Appln. No. 2023-551790 (Sep. 4, 2024).

* cited by examiner

WELDING ASSEMBLY COMPRISING A WELDING DEVICE AND A WELDING COMPONENT CONNECTED TO THE WELDING DEVICE

The invention relates to a welding assembly comprising a welding device and a welding component connected to the welding device and comprising a HF (high-frequency) ignition unit for generating a HF ignition voltage or HF ignition energy for igniting an arc for welding, wherein a data line is provided between the welding device and the welding component, and data communication between the welding device and the welding component is implemented via the data line, and a decoupling apparatus for a HF voltage is provided on the data line.

Various fusion arc welding methods are known, for example: MIG (metal inert gas), MAG (metal active gas), TIG (tungsten inert gas), MMA (manual metal arc), WAAM (wire arc additive manufacturing) or plasma welding. In MIG, MAG, MMA and WAAM welding, a consumable electrode is used which simultaneously serves as a weld filler material. In TIG and plasma welding, a non-consumable electrode is used and a filler material is supplied separately to the arc as needed during the welding. Various methods are also known for igniting the arc at the beginning of the welding. Substantially, there is contact ignition, in which contact between the welding electrode and the workpiece to be welded is produced for the purpose of ignition and, after contact, when the welding electrode is withdrawn from the workpiece, the arc is ignited by the electric current flowing through the welding electrode. In the case of contactless ignition, the welding electrode is held at a distance from the workpiece to be welded, and a high-frequency high voltage is applied to the welding electrode in order to ionize the gas space between the welding electrode and a workpiece surface and make said gas space electrically conductive, and consequently to ignite a stable arc via a cascade effect that occurs. In this high-frequency ignition (HF ignition), a high-voltage transformer is generally used, the secondary side of which is arranged, for example, in a welding line connected to the welding electrode or in parallel between the two welding lines in order to couple the HF ignition voltage (generally a high voltage in the range of 1 kV to 20 kV) into a welding line or in parallel between the two welding lines. Both the various welding methods and the various ignition methods can be applied during manual welding and during robot welding.

In order to ensure a HF ignition that is as stable as possible, it is advantageous that the HF ignition energy for the HF ignition spark between the welding electrode and the workpiece is used to ignite the arc and does not completely or partially flow out as a leakage current and/or as a creepage current via other undesired electrically conductive and/or usually electrically non-conductive paths. Due to the very high HF ignition voltage, paths which are non-conductive per se can also become conductive, and leakage currents or creepage currents can occur. Paths via which creepage currents or leakage currents can occur are generally referred to as electrical leakage paths. For safety reasons, the permissible HF ignition energy quantity is limited by standards, for example by EN 60974-3 for arc ignition and stabilization devices, so that the ignition energy cannot be increased as desired in order to compensate for possible losses due to electrical leakage paths. It is therefore important to reduce or eliminate the outflow of HF ignition energy via electrical leakage paths. For this purpose, it is already known to arrange a choke coil in the welding line between the power section of a welding device and the high-frequency generator for generating the HF ignition voltage, in order to conduct the entire HF ignition energy to the welding electrode and to prevent the outflow of HF ignition energy into the welding device via the welding line, as shown, for example, in EP 1 704 012 131. However, such choke coils can only be used appropriately in electrical lines via which low-frequency useful signals flow, because otherwise the choke coils would also dampen or completely block a high-frequency useful signal in an undesired manner. Such low-frequency useful signals are to be found, for example, in welding lines (welding current) or in electrical supply lines.

Electronics are often also used in modern welding torches and are supplied with supply voltage by the welding device via a supply line. The electronics in the welding torch serve, for example, to control the welding process. Operating elements for the welder can be arranged on the welding torch, for example buttons, knobs, rotary knobs, etc., and can be actuated by the welder to influence the welding process, for example by setting or adjusting welding parameters. Likewise, display elements, such as a display, lamps, etc., can be provided on the welding torch in order to display information of the welding or of the welding process to the welder. In addition, a measuring element can be provided in the welding torch or in a wire feed, for example for measuring the arc voltage or a welding current, wherein measured values recorded by the measuring element are transmitted to the welding device via a data line. The arc voltage is required, for example, for the active control of the welding wire feed (consumable electrode or separate filler material). A measurement line can also be routed from the welding torch to the welding device in order to measure the arc voltage in the welding device, wherein such a measurement line can also be regarded as a data line for the present invention. Via the data line, analog or digital data or signals from operating elements or display elements or other parts of a welding assembly can thus be transmitted.

For data lines, special data cables comprising electrical shielding and comprising preferably twisted lines have to be used in the surroundings of welding devices, in particular if a high data transmission speed of 1 Mbit/s up to several Gbit/s and a stable data transmission are required, because welding currents can have high rates of change (e.g., steep welding current edges), which can lead to inductive interferences or couplings on the data line. However, the electrical shielding of the data line, which is usually grounded, is an ideal electrical leakage path, because the HF ignition voltage, for example in the hose pack, can be capacitively coupled into the shielding of the data line. When data lines are used without shielding, HF coupling into the wires of the data line can occur, as a result of which HF ignition energy can also flow out from the welding electrode and disturbances in the data communication can occur. The use of choke coils is already known for measurement lines, for example from EP 1 021 269 B1, wherein the choke coil of a measurement line is wound with the secondary side of a high-voltage transformer for HF ignition. The choke coil reduces high-frequency alternating currents, whereby, although the outflow of the HF ignition energy could be reduced, the low-pass effect of the choke would also restrict the possible information transmission via the measurement line, for example by damping or by limiting the frequency range of a measurement signal. However, it would be possible to wind a shielded or unshielded data line to form a choke coil in order to reduce the outflow of ignition energy via the data line. In the case of a choke coil in the data line, however, HF ignition energy would also be lost by the inevitable high-frequency remagnetization of the choke coil.

Another problem of choke coils in shielded data lines is that, due to the shielding and the structure of the data line, the bending radius of the data line must not fall below a certain value based on manufacturer specifications, in order not to bend and damage the shielding. However, this leads to a situation where a choke coil, which is formed by winding an iron core with the shielded data lines, would assume a large overall size. This makes the choke coil unmanageable, expensive and unusable in most cases. In shielded data lines for data transmission in which higher-frequency useful signals occur, choke coils would thus function in principle as well, but they very quickly become large-volume, expensive and heavy due to a minimum bending radius of the shielded data lines.

The use of a choke coil for a data line (or even for a plurality of data lines) is therefore less expedient for many reasons.

It is therefore an object of the present invention to reduce the outflow of HF ignition energy via a data line for data transmission between a welding device and another part of the welding assembly.

This problem is solved by the features of the independent claims.

The galvanic separation of the data line, including a galvanic separation of a possible shielding of the data line, prevents a possible HF leakage path via the data line, and the outflow of HF ignition energy can be reduced. In order to prevent a leakage path via the power supply of the coupling elements from being formed, the coupling elements are supplied with electrical energy by separate power supplies which are designed to be decoupled from one another for a given HF voltage on the data line, as a result of which no HF ignition energy can flow out via the power supplies. An effective HF decoupling on the data line can thus be realized without a choke coil in the data line.

Advantageously, the power supply of the first coupling element and/or of the second coupling element is designed as a battery. Separate batteries can be designed to be decoupled for the HF voltage in a simple manner, for example by a sufficient spatial spacing of the battery poles, in order to prevent the formation of a spark gap.

In a particularly advantageous embodiment, a supply line conducting supply voltage is used to supply power to the coupling elements. For this purpose, a choke coil is arranged in the supply line, which choke coil is designed to decouple the two sides of the choke coil for a given HF voltage on the supply line and so that the power supply of the first coupling element taps the supply voltage on one side of the choke coil. Advantageously, the power supply of the second coupling element taps its supply voltage on the other side of the choke coil.

In an equally advantageous embodiment, light technology is used to decouple the power supplies. For this purpose, the power supply of the first coupling element and/or of the second coupling element is designed as a photovoltaic element, and a light source is provided which applies light to the photovoltaic element. In this case, it is advantageous if the light source is supplied with electrical energy by the power supply of the first coupling element and the photovoltaic element is provided as the power supply of the second coupling element. It can thus be achieved that the power supplies are decoupled via the light path for the HF voltage.

Figures 2, 3:
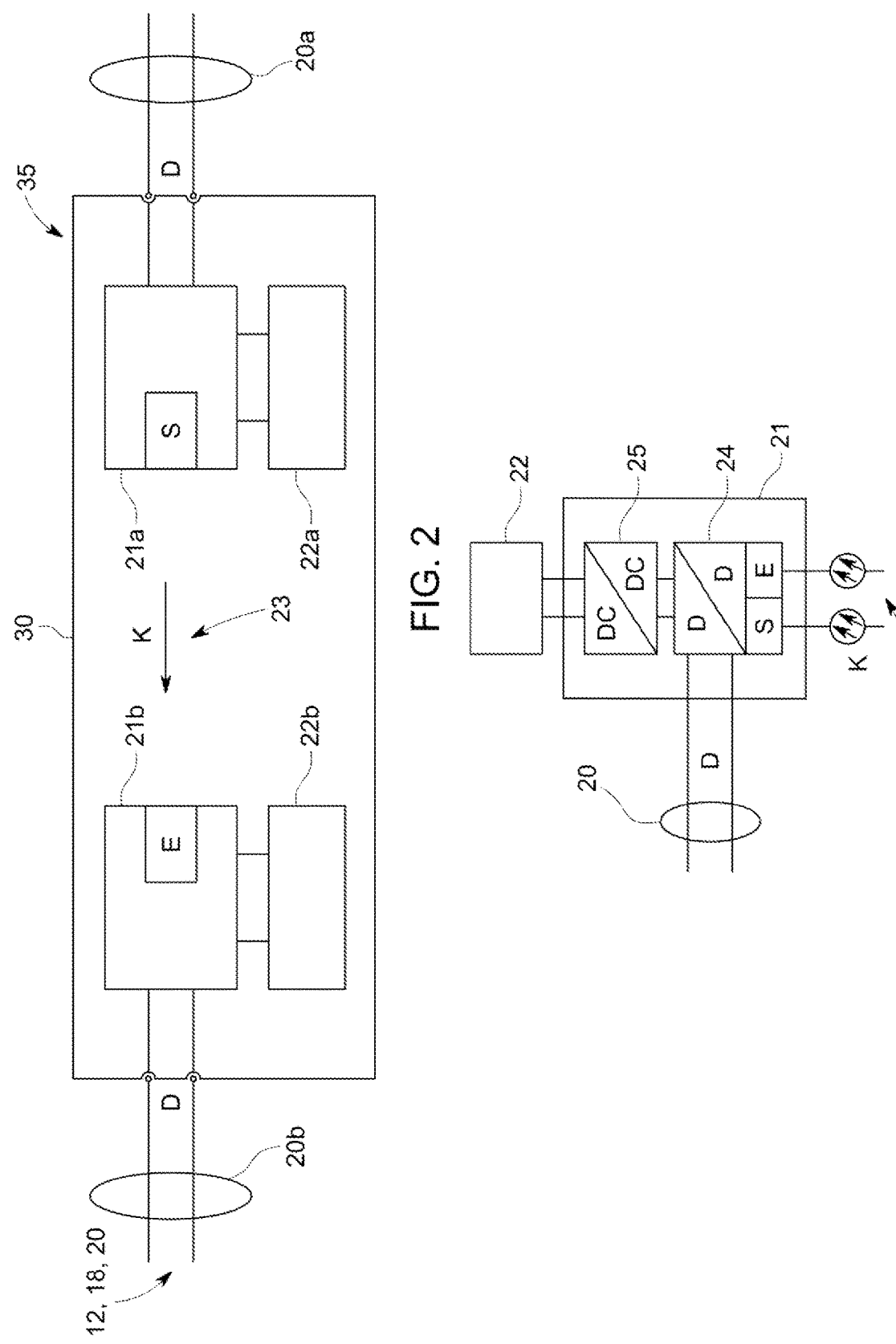
Figure 4:
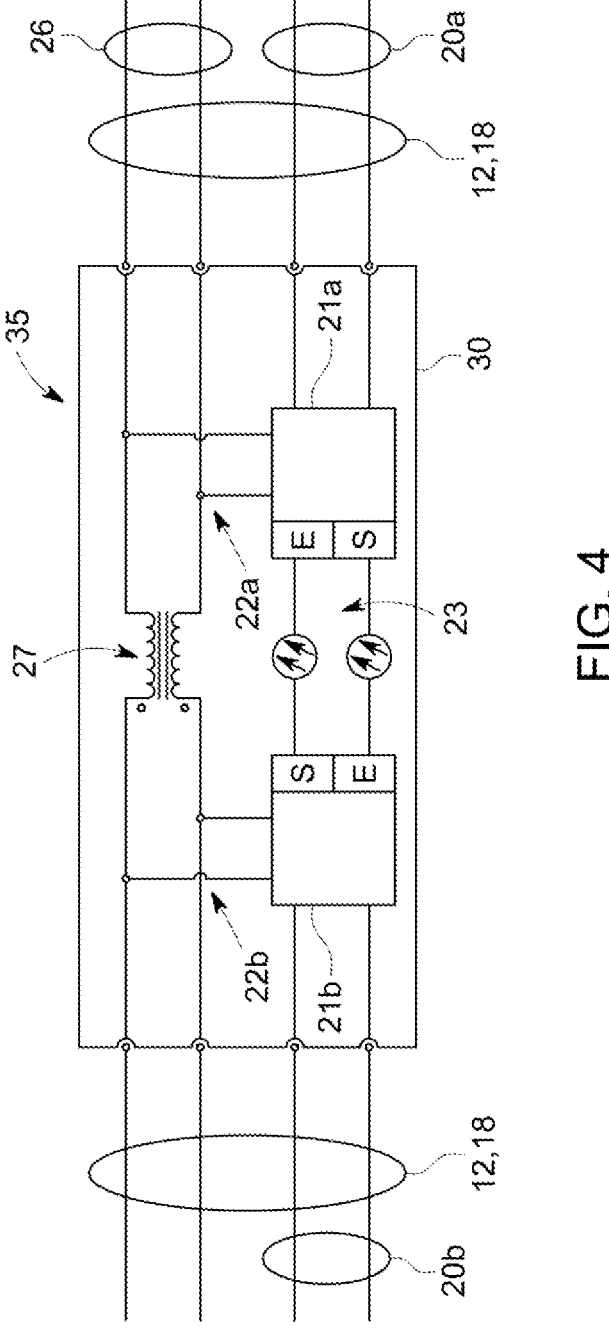
Figure 6:
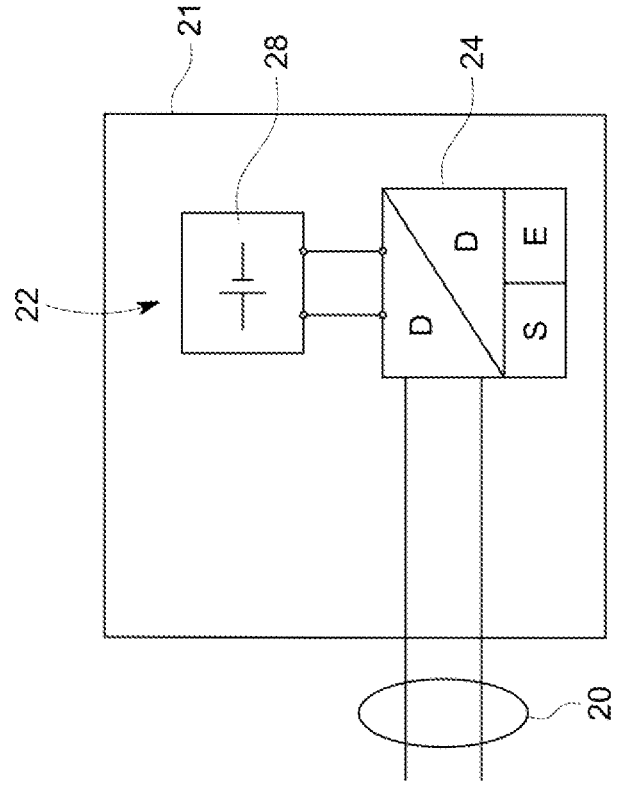
Figure 5:
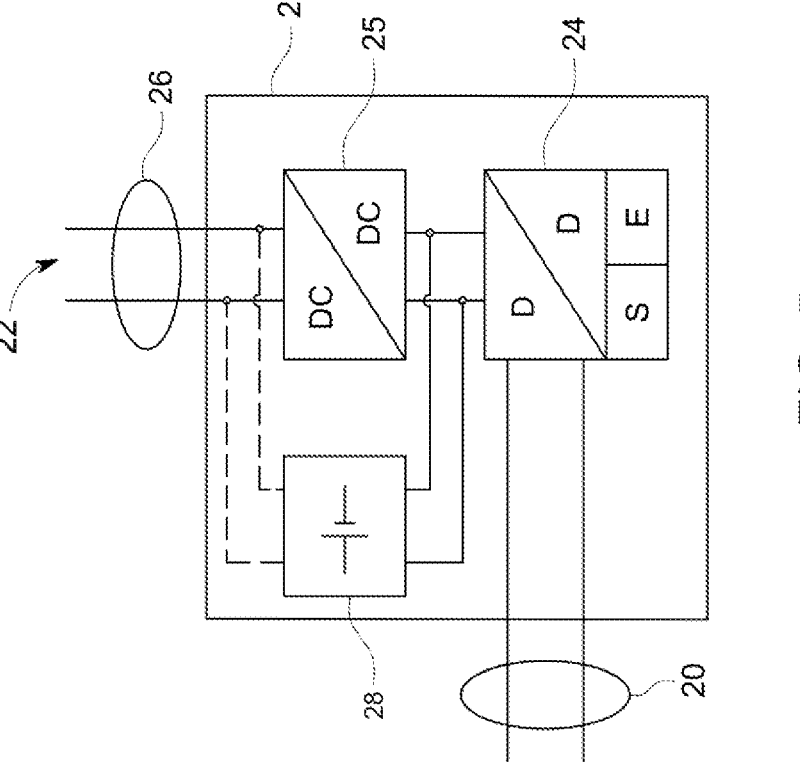
Figure 7:
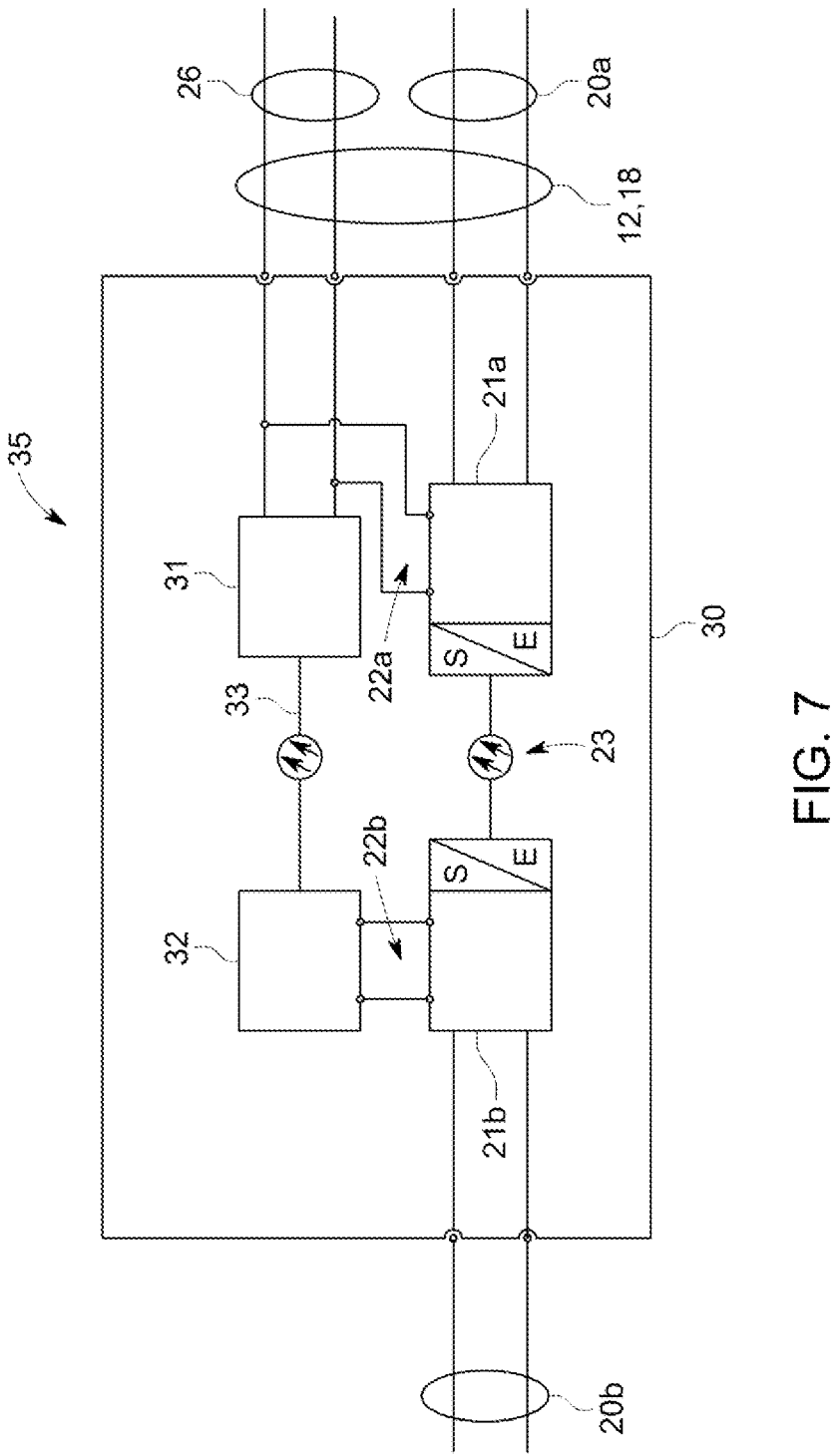

The present invention is described in greater detail below with reference to FIGS. 1 to 7, which show schematic and non-limiting advantageous embodiments of the invention by way of example. The following are shown:

FIG. 1 a welding assembly having HF ignition and a data line for data communication between a welding device and a welding component connected thereto via the data line, FIG. 2 a decoupling apparatus according to the invention, FIG. 3 an embodiment of a coupling element, FIG. 4 a decoupling apparatus according to the invention having electrical supply via a supply line, FIGS. 5 and 6 embodiments of a coupling element with a battery, and FIG. 7 HF decoupling of the power supplies via a light path.

FIG. 1 shows, by way of example and schematically, a welding assembly 1 for TIG welding. A welding electrode 4 on a welding torch 3, in this case a non-consumable welding electrode, is connected via an electrode line 5 to a welding device 2, for example via an electrode power socket 8 on the welding device 2. The workpiece 7 to be welded is connected via a ground line 6 to the welding device 2, for example via a ground power socket 9 on the welding device 2. During welding, an arc burns between the welding electrode 4 and the workpiece 7, and a welding current flows which is generated by a power unit 10 in the welding device 2. In the welding device 2, a welding control unit 11 is provided which controls and monitors the welding process. A user interface (not shown) can also be provided on the welding device 2, via which interface a user can select, adjust or change welding parameters of the welding process. The welding torch 3 is connected to the welding device 2 via a welding control line 12, for example via a control line socket 13 on the welding device 2. Operating elements 14 on the welding torch 3, for example buttons, displays, rotary knobs etc., can be connected to the welding control unit 11 via the welding control line 12, as a result of which the welding device 2 and the welding torch 3 can exchange data in a unidirectional or bidirectional manner. Welding parameters of the welding process can also be selected, set or changed via such operating elements 14 on the welding torch 3, and/or set welding parameters can be displayed.

The electrode line 5 and the welding control line 12 are usually arranged in a common hose pack 25. In such a hose pack 25, further lines could also be arranged in a well-known manner, for example a line for protective gas, coolant lines for burner cooling, a welding wire line, etc.

In the exemplary embodiment shown in FIG. 1, a welding wire feed unit 15 is also provided which supplies welding wire 16 to the welding point. The welding wire feed unit 15 can be integrated into the welding device 2, but can also be designed as a separate unit. The welding wire feed unit 15 can be controlled by the welding control unit 11 by means of a wire control line 18, in order to perform the welding process. The wire control line 18 can, in particular in the case of an external welding wire feed unit 15, be inserted into a wire control line socket 29 on the welding device 2, which in turn can be connected to the welding control unit 11. In other welding assemblies, the welding wire can also be routed within the hose pack 25 and can also function as a consumable welding electrode.

The welding control line 12 can comprise different lines. For example, an electrical supply line (also as a multi-pole line) can be provided in order to supply operating elements 14 on the welding torch 3 with electrical energy. For data transmission between the welding device 2 and the welding torch 3, a data line 20 can also be provided in the welding control line 12 (not shown in FIG. 1), via which line a data communication bus can be implemented, via which data can be transmitted with a predetermined communication protocol. A measurement or signal line can also be provided as a data line, for example in order to detect a voltage potential at the welding electrode 4 or to transmit analog signals.

The wire control line 18 can also comprise different lines. For example, an electrical supply line (also as a multi-pole line) can be provided for the electrical supply of the welding wire feed unit 15 via the welding device 2. The wire control line 18 can also comprise a data line 20 (not shown in FIG. 1) via which a data communication bus can be implemented, via which data for controlling and/or for regulating the welding wire feed can be transmitted in a unidirectional or bidirectional manner with a predetermined communication protocol.

For ignition (also in the sense of re-ignition) of the arc for welding, in addition to a possibly present no-load voltage increase (not shown) and a possibly present auxiliary voltage source (not shown), a HF voltage source 19 can be provided in a high-frequency (HF) ignition unit 17, which HF voltage source generates a HF ignition voltage $u_Z$, usually in the form of ignition voltage pulses having a voltage amplitude $u_Z$, which is coupled into a welding line, usually the electrode line 5. In the exemplary embodiment according to FIG. 1, a HF voltage source 19 is provided, the output voltage of which is stepped up to the HF ignition voltage $u_Z$ using a HF transformer. In this embodiment, the secondary winding of the HF transformer is arranged in the line between the power unit 10 and the electrode power socket 8, and the HF ignition voltage $u_Z$ is coupled into the electrode line 5. The HF ignition voltage $u_Z$ can, however, also be applied between the electrode line 5 and the ground line 6. The HF ignition unit 17 does not necessarily have to be arranged in the welding device 2, but could also be arranged as a separate component externally to the welding device 2 or in a welding wire feed unit 15.

The gas in the surroundings of the welding electrode 4 is ionized by the HF ignition voltage $u_Z$, and an arc is ignited. For the ionization of the gas or for the ionization of the gas path, it is necessary for an electrical high voltage in the range of 1 kV to 20 kV to be generated for HF ignition in a known manner, depending on the distance that exists between the welding electrode 4 and the workpiece 7. The HF ignition voltage $u_Z$ for the ignition is generated in the form of HF voltage pulses, which usually have very steep rising edges, typically with rise times in the 100 ns range. For safety reasons, the permissible HF ignition energy is limited, for example, to a maximum of 4 J/s. The total energy of the HF voltage pulses per second should thus be at most 4 J.

After the arc has been ignited, the HF ignition voltage $u_Z$ is withdrawn again and the welding process is started. Such a HF ignition and possible embodiments of such a HF ignition are well known.

Because of the spatial proximity of the welding control line 12 (with a data line 20) and the electrode line 5, for example in a hose pack 25 or in the welding torch 3, applying a HF ignition voltage $u_Z$ to the electrode line 5 can result in crosstalk (inductively or capacitively or else via a spark or creepage path) between the electrode line 5 and a line of the welding control line 12, as a result of which HF ignition energy flows out and less HF ignition energy is available to ignite the arc. It has been shown that in particular the shielding of a shielded data line 20 in the welding control line 12, for example a shielded data cable for data communication, forms a particularly good HF leakage path. Furthermore, electrically conductive materials which run parallel to the data line 20 over certain paths, for example cable routes or grounding lines, can likewise form a good HF leakage path.

However, a HF leakage path can also form via the welding wire 16. To ignite the arc, the ignition spark is intended to jump over from the welding electrode 4 to the workpiece 7. However, it may happen that a spark gap is formed between the welding electrode 4 and the welding wire 16. Because of the high voltage of the HF ignition voltage $u_Z$ and also because of the steep-edged voltage pulses, crosstalk (inductively, capacitively) of the HF ignition voltage $u_Z$ to the wire control line 18 can occur. Here too, the shielding of a shielded data line 20 in the wire control line 18, for example a shielded data cable for data communication, forms a particularly good HF leakage path. Thus, HF ignition energy can also flow out via the welding wire 16 and the wire control line 18.

On account of a HF voltage, a HF current caused by the HF ignition voltage $u_Z$ can flow via the HF leakage path. The HF current and the HF voltage are naturally also dependent on the type of HF leakage path. The HF voltage can be in the order of magnitude of the HF ignition voltage $u_Z$, i.e., also in the high-voltage range, and in certain cases can even correspond to the HF ignition voltage $u_Z$.

Because the HF ignition energy cannot be increased as desired, such an outflow of HF ignition energy via a welding control line 12 and/or a wire control line 18, or via a data line 20 arranged therein, is to be avoided or at least reduced to a large extent. In order to achieve this, a decoupling apparatus 35 for a possible HF voltage on the data line 20 is provided, as described below with reference to FIG. 2.

A data line 20, for example in the wire control line 18 or welding control line 12, is galvanically separated by means of the HF decoupling apparatus 35 into a first data line portion 20a and a second data line portion 20b. Any shielding of the data line 20 is thus likewise galvanically separated. The first data line portion 20a is connected to a first coupling element 21a and the second data line portion 20b is connected to a second coupling element 21b. The coupling elements 21a, 21b are connected to one another in the HF decoupling apparatus 35 via a non-electrical coupling path 23. The coupling elements 21a, 21b convert the electrical signals D on the data line 20 into a wirelessly transmittable transmission signal K, which is transmitted by a wireless transmitter S via the wireless coupling path 23 to a wireless receiver E. A transmitter S and a receiver E can each be provided in the two coupling elements 21a, 21b for bidirectional transmission. In principle, it would also be possible for an individual line to be operated bidirectionally and to have a transmitter S and/or a receiver E at both ends. "Wireless" is understood here to mean transmission without electrical conductors as a transmission path between the transmitter S and the receiver E, i.e., an electrically insulating transmission path. The wireless coupling path 23 can be, for example, air, a vacuum, an electrically non-conductive fluid or an optical waveguide, but in any case is not an electrical conductor. The wirelessly transmittable transmission signal K may be present, for example, as an electromagnetic wave (light), or as a sound wave (for acoustic transmission), or as a magnetic alternating field (inductive transmission), provided that the air gaps and creepage paths can be maintained.

Each coupling element 21a, 21b has a separate power supply 22a, 22b in the decoupling apparatus 35 for the conversion unit implemented therein for converting the electrical signals D on the data line 20 into the wirelessly transmittable transmission signal K. The conversion unit in the coupling element 21*a*, 21*b* can be designed as a converting unit, data converter, transceiver unit, transceiver or signal converter. There is no electrical path between the power supplies 22*a*, 22*b* for the HF ignition voltage $u_Z$ to flow out, and this can be ensured, for example, by a corresponding design or configuration.

A possible embodiment of a coupling element 21 comprising a conversion unit is shown in FIG. 3. The electrical signal D on the data line 20 is converted in a digital/digital converter 24 in a suitable manner and transmitted wirelessly via a transmitter S as a transmission signal K. In this exemplary embodiment, the coupling path 23 is designed as an optical waveguide. Conversely, a transmission signal K wirelessly received via a receiver E can be converted into the electrical signal D of the data line 20 via the digital/digital converter 24. It is obvious that the digital/digital converter 24 is adapted to the data communication protocol of the data line 20 and to the type of wireless transmission on the coupling path 23, just like the transmitter S and the receiver E. A voltage converter 25 can also be provided, for example a DC/DC converter as shown in FIG. 3, in order to adapt the supply voltage of the power supply 22 to the requirements of the coupling element 21. A person skilled in the art is able to adapt the coupling element 21 accordingly to the particular application, without further explanations in this regard.

The individual components of the coupling element 21 are usually designed as electronics. For this purpose, the electronic circuit is usually arranged on a printed circuit board on which the components of the electronic circuit lie close together. It should be kept in mind that the HF ignition voltage $u_Z$ is designed to overcome ignition paths of several centimeters. A HF voltage, which can be in the order of magnitude of the HF ignition voltage $u_Z$, on the data line 20, or the shielding thereof, can therefore be easily transmitted in such an electronic circuit with small distances between the lines and components, for example by inductive or capacitive crosstalk or by means of a spark or creepage path that forms. This is also a reason why the power supplies 22*a*, 22*b* (see in particular in FIG. 2) are designed to be decoupled from one another for the HF voltage, because the HF voltage could otherwise also be forwarded via the power supplies 22*a*, 22*b*.

By means of the coupling elements 21*a*, 21*b* and the wireless coupling path 23, a HF voltage applied to the data line 20, for example in the shielding thereof, is blocked and cannot be transmitted from the first data line portion 20*a* to the second data line portion 20*b*, or vice versa. Due to the separate power supplies 22*a*, 22*b*, no HF leakage path can form via the power supplies 22*a*, 22*b* either, and no HF current can flow. The electrical signal D to be transmitted on the data line 20 is not influenced thereby.

An advantageous embodiment of the power supplies 22*a*, 22*b* is explained with reference to FIG. 4. The embodiment of the coupling elements 21*a*, 21*b* is as described above, here for example with optical waveguides as the coupling path 23.

In addition to the data line 20, in this case a supply line 26 is also arranged, via which certain components are supplied with electrical energy by the welding device 2, for example a welding wire feed unit 15 or operating elements 14 on the welding torch 3. For HF decoupling, a choke coil 27 is arranged in the supply line 26 in a known manner. To form the choke coil 27, the wires of the supply line 26 are wound onto a ferrite core in a known manner. Further circuitry with inductors, capacitors and/or resistors could also be provided on the choke coil 27, for example in order to adapt the damping. The choke coil 27 prevents a HF voltage from being transmitted via the supply line 26. The supply line 26 on the two sides of the choke coil 27 is thus HF-decoupled. This can be used to supply the coupling elements 21*a*, 21*b* with electrical energy. Each of the two coupling elements 21*a*, 21*b* draws the required electrical energy from the supply line 26 on one of the two sides of the choke coil 27, as a result of which the power supplies 22*a*, 22*b* for the HF ignition voltage $u_Z$ are designed to be decoupled from one another.

Furthermore, in a specific embodiment of a data network, a data line 20*a* could serve for supplying a first digital/digital converter 24 and the data line 20*b* could serve for supplying a second digital/digital converter 24, wherein the two supplies would be decoupled accordingly.

A power supply 22*a*, 22*b* can also be designed as a separate battery 28, as in FIG. 6, or an additional battery 28 can be provided, as in FIG. 5. Furthermore, it can be provided to replace a battery 28 with simple means.

Commercially available rechargeable batteries such as lithium-ion cells and the like can also be used as the battery 28. It would also be conceivable to be able to charge the rechargeable cells of the power supplies 22*a*, 22*b* individually via suitable adapters, for example USB adapters. In this case, it would also be conceivable for photovoltaic elements to supply this energy while maintaining galvanic isolation. The photovoltaic element is understood to be any component, for example a solar cell, which converts light directly into electrical current, for example based on the photoelectric effect. It would also be obvious to a person skilled in the art to have a battery 28 with a higher charging capacity in a coupling element 21 functioning as transmitting unit than in the coupling element 21 functioning purely as receiver.

Furthermore, an energy supply to a coupling element 21*a*, 21*b* via light technology, in particular laser technology, would also be possible as the power supply 22, because this technology would also bring about a perfect galvanic isolation. This is shown, for example, in an exemplary embodiment in FIG. 7. For example, light, e.g., laser light, from a light source 31, for example a laser, could be focused in this case on a photovoltaic element 32, for example via an optical waveguide 33. The light source 31 can be supplied with electrical energy by a supply line 26 (as in FIG. 7) or else by a battery 28. This supply line 26 or a battery 28 can also serve as an electrical power supply 22*a* of a first coupling element 21*a*. The photovoltaic element 32 serves as a power supply 22*b* for the second coupling element 21*b*. However, the photovoltaic element 32 can also charge an internal battery 28 (e.g., as in FIG. 5). As in FIG. 4, the supply line 26 can also be routed through the decoupling apparatus 35 via a choke coil 27.

When using a supply line 26 or a photovoltaic element 32 for supplying power to a coupling element 21, a battery 28 could additionally be provided, as shown in FIG. 5. By means of the battery 28, which could optionally also be charged via the supply line 26 (as indicated by dashed lines in FIG. 5), the data communication via the data line 20 could also be maintained if the supply line 26 is de-energized.

The coupling elements 21*a*, 21*b* and optionally also the power supplies 22*a*, 22*b*, and the optional batteries 28, of the decoupling apparatus 35 are preferably arranged in a decoupling box 30 within a common housing. This makes it possible to provide inventive HF decoupling of a data line 20 at any desired point of a welding assembly. Corresponding connection sockets can be provided on the decoupling box 30 in order to connect the data line 20, and also any other lines, such as a supply line 26, thereto. In a welding assembly according to FIG. 1, the decoupling box 30 could be arranged, for example, upstream of the control line socket 13 on the welding device 2, or in the wire control line 18 between the welding device 2 and the welding wire feed unit 15. A decoupling box 30 could of course also be arranged as necessary at several points of the welding assembly 1, for example at the two aforementioned positions.

A decoupling apparatus 35 according to the invention can of course also be used in a welding assembly 1 in which no HF ignition is provided or used.

Likewise, a decoupling apparatus 35 for a possible HF voltage on a data line 20 can also be provided in other arrangements comprising a device and a further component of the arrangement. A data line 20 is provided between the device and the further component, and data communication between the device and the further component is implemented via the data line 20. For example, the arrangement can be a photovoltaic system having a control unit as the device and a photovoltaic inverter for feeding electrical energy into a supply network as the further component, or it can be a photovoltaic system having a photovoltaic inverter for feeding electrical energy into a supply network as the device and a photovoltaic module as the further component. The arrangement can also be a battery charging system, comprising a charging device as the device and a battery or a battery management unit as the further component.

The invention claimed is:

1. A welding assembly with a welding device and a welding component connected to the welding device and with a HF ignition unit for generating a HF ignition voltage for HF ignition of an arc for welding, a data line being provided between the welding device and the welding component, and data communication between the welding device and the welding component being implemented via the data line, wherein a decoupling apparatus is provided in which a first data line portion of the data line is connected to a first coupling element and a second data line portion of the data line is connected to a second coupling element, and the first coupling element and the second coupling element being interconnected via a wireless coupling path for galvanic separation of the data line, and in that and wherein a separate power supply is provided for each of the first coupling element and the second coupling element, and the power supplies of the first coupling element and of the second coupling element are decoupled from one another for a HF voltage on the data line as a result of the HF ignition voltage.

2. The welding assembly according to claim 1, wherein the power supply of the first coupling element and/or of the second coupling element is designed as a battery.

3. The welding assembly according to claim 1, wherein a supply line conducting supply voltage is provided in the welding assembly, a choke coil being arranged in the supply line, which choke coil is designed to decouple the two sides of the choke coil for a given HF voltage on the supply line, and in that the power supply of the first coupling element taps the supply voltage on one side of the choke coil.

4. The welding assembly according to claim 3, wherein the power supply of the second coupling element taps the supply voltage on the other side of the choke coil.

5. The welding assembly according to claim 1, wherein the power supply of the first coupling element and/or of the second coupling element is designed as a photovoltaic element, and in that a light source is provided which applies light to the photovoltaic element.

6. The welding assembly according to claim 5, wherein a battery is provided which supplies the light source with electrical energy.

7. The welding assembly according to claim 5, wherein the light source is supplied with electrical energy by the power supply of the first coupling element, and the photovoltaic element is provided as the power supply of the second coupling element.

8. The welding assembly according to claim 7, wherein a supply line having a supply voltage is routed through the decoupling apparatus, and the supply line is provided as the power supply of the first coupling element.

9. The welding assembly according to claim 1, wherein the decoupling apparatus is designed as an independent unit in the form of a decoupling box.

10. A method for decoupling a data line from a HF voltage on the data line, data being exchanged, via the data line, between a welding device and a welding component connected to the welding device, and a HF ignition voltage for HF ignition of an arc for welding with the welding device being generated with a HF ignition unit, the HF ignition voltage generating the HF voltage on the data line, wherein the data line is galvanically separated into a first data line portion and a second data line portion, and the first data line portion is connected to a first coupling element and the second data line portion is connected to a second coupling element, and the first coupling element and the second coupling element being interconnected via a wireless coupling path, wherein the first coupling element and the second coupling element are each supplied with power by a separate power supply and the power supplies of the first coupling element and of the second coupling element are decoupled from one another for the HF voltage on the data line.

* * * * *